United States Patent [19]
Nakamura et al.

[11] Patent Number: 5,079,919
[45] Date of Patent: Jan. 14, 1992

[54] HYDRAULIC DRIVE SYSTEM FOR CRAWLER MOUNTED VEHICLE

[75] Inventors: Kazunori Nakamura, Ibaraki; Toichi Hirata, Ushiku, both of Japan

[73] Assignee: Hitachi Construction Machinery Co., Ltd., Tokyo, Japan

[21] Appl. No.: 571,532

[22] PCT Filed: Mar. 29, 1990

[86] PCT No.: PCT/JP90/00426

§ 371 Date: Aug. 28, 1990

§ 102(e) Date: Aug. 28, 1990

[30] Foreign Application Priority Data

Mar. 30, 1989 [JP] Japan ........................... 1-76657

[51] Int. Cl.⁵ .......................................... F16D 31/02
[52] U.S. Cl. ........................................ 60/426; 60/427; 60/450; 60/484; 91/517; 91/531
[58] Field of Search ............... 60/426, 427, 444, 450, 60/484; 91/517, 531

[56] References Cited

U.S. PATENT DOCUMENTS

| | | | |
|---|---|---|---|
| 3,623,322 | 11/1971 | Hancock | 60/484 |
| 3,720,059 | 3/1973 | Schuwarski et al. | 91/531 X |
| 3,987,623 | 10/1976 | Bianchetta | 60/484 X |
| 4,011,721 | 3/1977 | Yip | 60/450 X |
| 4,354,797 | 10/1982 | Hirose et al. | 91/517 X |
| 4,617,854 | 10/1986 | Kropp | 91/517 |
| 4,617,854 | 10/1986 | Kropp | 91/531 X |
| 4,716,728 | 1/1988 | Kakeya | 60/426 |
| 4,788,820 | 12/1988 | Sakai et al. | 60/484 X |
| 4,850,191 | 7/1989 | Kreth et al. | 60/426 X |
| 4,920,748 | 5/1990 | Kordak et al. | 60/444 X |
| 4,945,723 | 8/1990 | Izumi et al. | 91/531 X |
| 4,967,557 | 11/1990 | Izumi et al. | 60/426 X |

FOREIGN PATENT DOCUMENTS 8100742 3/1981 PCT Int'l Appl. .............. 60/426

Primary Examiner—Edward K. Look
Assistant Examiner—Todd Mattingly
Attorney, Agent, or Firm—Fay, Sharpe, Beall, Fagan, Minnich & McKee

[57] ABSTRACT

A hydraulic drive system for a crawler mounted vehicle has a hydraulic pump, a plurality of actuators including a pair of left and right travel motors and at least one other actuator that are driven by hydraulic fluid delivered from the hydraulic pump. The system further contains a plurality of flow control valves for controlling flows of the hydraulic fluid supplied to the respective actuators, and a plurality of distribution compensating valves for controlling differential pressures across the respective flow control valves, the plurality of distribution compensating valves each having drive parts to set a target value of the differential pressure across the associated flow control valve. The hydraulic drive system also has a speed selector for outputting a select signal to change operation speeds of the pair of travel motors, and a controller and a control pressure generator for controlling the drive parts of the distribution compensating valves associated with the pair of travel motors. The target values of the differential pressures across the associated flow control valves are varied by the controller and the control pressure generator in accordance with the speed that is selected.

10 Claims, 13 Drawing Sheets

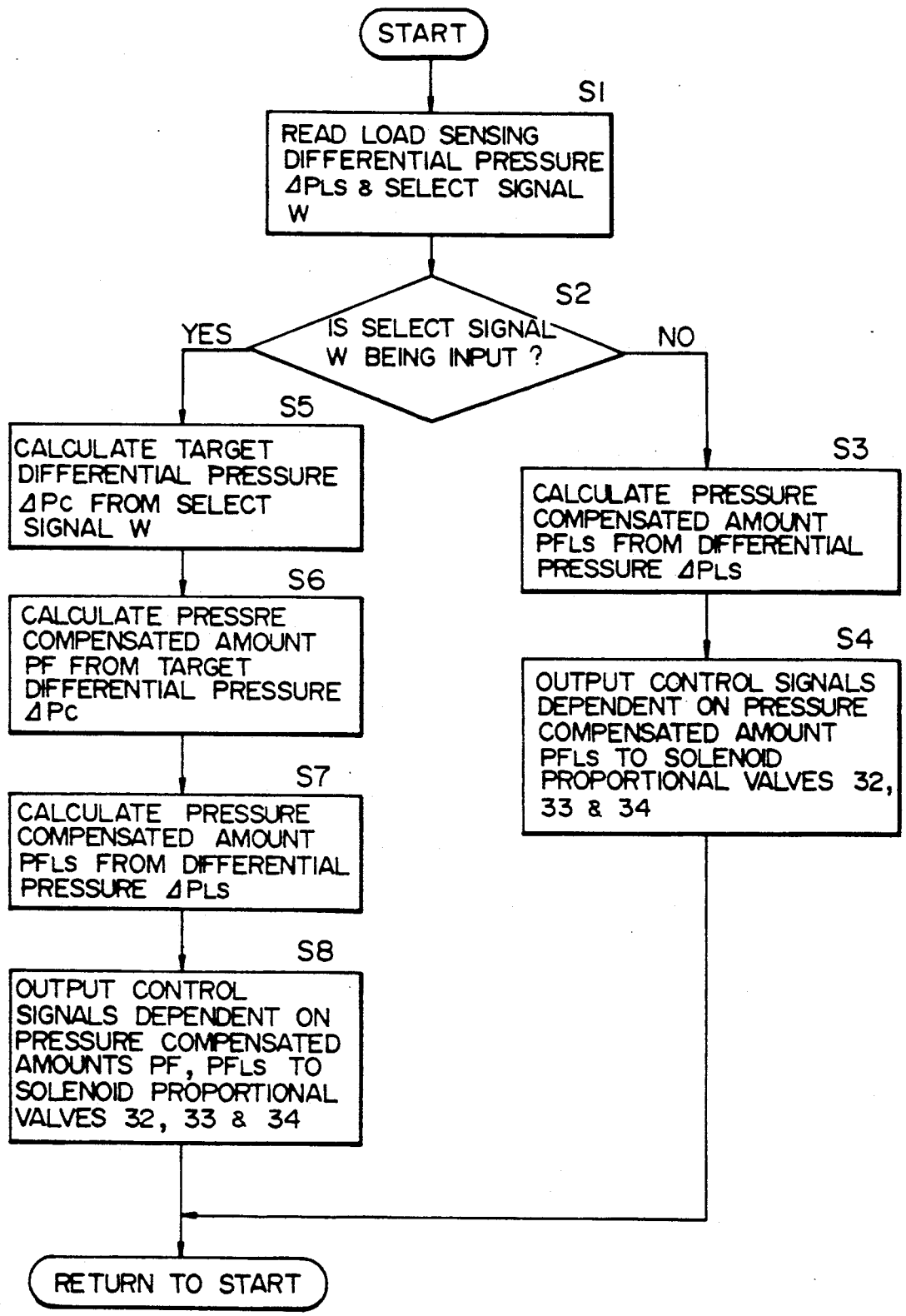

HYDRAULIC DRIVE SYSTEM FOR CRAWLER MOUNTED VEHICLE

TECHNICAL FIELD

The present invention relates to a hydraulic drive system for crawler mounted vehicles such as hydraulic excavators, and more particularly to a hydraulic drive system in which hydraulic fluid is distributed and supplied from a hydraulic pump via a plurality of pressure compensating valves to a plurality of associated actuators, including a pair of left and right travel motors, for performing the combined operation of traveling and any other at least one kind of operation.

BACKGROUND ART

A hydraulic excavator is known as one example of a crawler mounted vehicle in which a plurality of actuators including a pair of left and right travel motors are simultaneously driven to perform the combined operation of traveling and any other at least one kind of operation. Such a hydraulic excavator comprises a lower travel body including a pair of left and right crawler belts to move the hydraulic excavator, an upper swing which is swingably mounted on the lower travel body, and a front mechanism consisting of a boom, an arm and a bucket. Various equipment such as a cab, a prime mover and a hydraulic pump are mounted on the upper swing to which is also attached the front mechanism.

A hydraulic drive system for use in that type crawler mounted vehicle may be constituted as a load sensing system which includes a pump regulator for controlling the pump delivery rate such that a delivery pressure of the hydraulic pump is held higher a fixed value than a maximum load pressure among the plurality of actuators, causing the hydraulic pump to deliver a hydraulic fluid at a flow rate necessary for driving the actuators, as disclosed in JP, A, 60-11706 by way of example. In the load sensing system, a pressure compensating valve is generally disposed upstream of each flow control valve. This permits a differential pressure across the flow control valve to be held at a predetermined value decided by a spring of the pressure compensating valve. By thus arranging the pressure compensating valve to hold the differential pressure across the flow control valve at the predetermined value, when plural actuators are simultaneously driven, the differential pressures across the flow control valves associated with all the actuators can be held at the predetermined value. It is therefore possible to precisely perform flow rate control for all the flow control valves irrespective of fluctuations in load pressures, allowing the plural actuators to be simultaneously driven at desired drive speeds in a stable manner.

In the load sensing system disclosed in JP, A, 60-11706, means for applying the pump delivery pressure and the maximum load pressure in directions opposite to each other is provided in place of the spring of each pressure compensating valve, so as to set the above predetermined value in accordance with the differential pressure therebetween. As mentioned above, the differential pressure between the pump delivery pressure and the maximum load pressure is held at the predetermined value by the pump regulator. Accordingly, the differential pressure between the pump delivery pressure and the maximum load pressure can be used, in place of the spring, to set the predetermined value of the differential pressure across each flow control valve. This also permits the plural actuators to be simultaneously driven in a stable manner as with the above case.

In the case of using the differential pressure between the pump delivery pressure and the maximum load pressure in place of the spring, when the hydraulic pump is saturated and the delivery rate runs short to supply the demanded flow rate, that differential pressure is lowered and the resulting lowered differential pressure is applied to all the pressure compensating valves, whereby the differential pressures across the flow control valves are now all held at a value smaller than the predetermined value during a normal mode. As a result, under such shortage of the pump delivery rate, the hydraulic fluid is prevented from being preferentially supplied to the actuator on the lower load side at a higher flow rate, so that the pump delivery rate is distributed at a ratio corresponding to the ratio of the individual demanded flow rates. In other words, the pressure compensating valves can develop a distribution compensating function even in a saturated condition of the hydraulic pump. With this distribution compensating function, the drive speed ratio of the plural actuators can properly be controlled even in a saturated condition of the hydraulic pump to enable the stable combined operation of the actuators.

Note that the pressure compensating valve installed to develop the distribution compensating function even in a saturated condition of the hydraulic pump, as mentioned above, is called "a distribution compensating valve" in this description for convenience of explanation.

However, the foregoing conventional hydraulic drive system has a problem as follows.

In the conventional hydraulic system, traveling speeds are basically controlled by operating control levers of the left-hand and right-hand travel motors. When lowering the traveling speed at the same operation amounts of the control levers, the delivery rate of the hydraulic pump is decreased to reduce the flow rate of the hydraulic fluid supplied to the left-hand and right-hand travel motors. Such a decrease in the delivery rate of the hydraulic pump is effected by, for example, lowering the revolution speed of the prime mover which drives the hydraulic pump. In other words, lowering the revolution speed of the prime mover reduces the available maximum delivery rate of the hydraulic pump. If the available maximum delivery rate is smaller than the flow rate demanded by operating the control levers, the hydraulic pump gets into saturation and the flow rate of the hydraulic fluid supplied to the left-hand and right-hand travel motors is decreased to lower the traveling speed.

With the above prior art of decreasing the revolution speed of the prime mover to reduce the delivery rate of the hydraulic pump and hence lower the traveling speed, during the combined operation of traveling and boom-up/down, the reduced delivery rate of the hydraulic pump is distributed at a ratio corresponding to the ratio of the demanded flow rates under the aforesaid action of the distribution compensating valves. This decreases the flow rate of the hydraulic fluid supplied to a boom cylinder, lowering the operation speed of the boom cylinder and degrading working efficiency. On the contrary, in an attempt of increasing the traveling speed during the combined operation of traveling and boom-up/down, the boom cylinder is speeded up in its operation, resulting in a fear that safety may decline dependent on the type of work. Thus, the conventional hydraulic drive system has had a problem that working efficiency and safety are degraded due to changes in the traveling speed during the combined operation inclusive of traveling.

An object of the present invention is to provide a crawler mounted vehicle for a hydraulic drive system with which traveling speeds can be changed without depending on the delivery rate of a hydraulic pump.

SUMMARY OF THE INVENTION

To achieve the above object, the present invention provides a hydraulic drive system for a crawler mounted vehicle comprising a hydraulic pump, a plurality of actuators including a pair of left and right travel motors and at least one other actuator which are driven by hydraulic fluid delivered from the hydraulic pump, a plurality of flow control valves for controlling flows of the hydraulic fluid supplied to the respective actuators, and a plurality of distribution compensating valves for controlling differential pressures across the respective flow control valves. the plurality of distribution compensating valves each having drive means to set a target value of the differential pressure across the associated flow control valve, wherein the hydraulic drive system further comprises first means for outputting a select signal to change operation speeds of the pair of travel motors; and second means for controlling the drive means of the distribution compensating valves associated with the pair of travel motors dependent on the select signal output from the first means, thereby to vary the target values of the differential pressures across the associated flow control valves.

With the present invention thus constituted, it is only required to operate the first means in an attempt of changing the traveling speed. Upon operation of the first means, the second means functions to control the drive means of the distribution compensating valves associated with the pair of travel motors, so that only the differential pressures across the associated flow control valves are changed. This change in the differential pressures across the flow control valves varies the flow rates of the hydraulic fluid supplied to the pair of travel motors. Accordingly, the traveling speed can be changed without depending on the delivery rate of the hydraulic pump.

Preferably, the first means includes means having a plurality of shift positions related to the operation speeds of the pair of travel motors and outputting the select signal corresponding to selected one of the shift positions.

Preferably, the second means includes third means for determining a control force dependent on the select signal output from the first means, and fourth means for controlling the drive means of the distribution compensating valves such that the control force is applied to the distribution compensating valves associated with the pair of travel motors.

The third means may include means for storing the functional relationship between the select signal output from the first means and the control force to be applied to the distribution compensating valves associated with the pair of travel motors, and means for determining the control force dependent on the select signal output from the first means based on the select signal and the said functional relationship.

Alternatively, the third means may include means for detecting a differential pressure between the delivery pressure of the hydraulic pump and the maximum load pressure among the plurality of actuators, means for storing a plurality of functional relationships between the detected differential pressure and the control force to be applied to the distribution compensating valves associated with the pair of travel motors, and means for selecting one of the plurality of functional relationships dependent on the select signal output form the first means and determining the control force corresponding to the detected differential pressure based on that differential pressure and the selected functional relationship.

Preferably, the second means includes a controller for calculating control forces to be applied to the distribution compensating valves and outputting corresponding signals, and control pressure generating means for generating control pressures dependent on the calculated control forces in accordance with the output signals. The control force generating means may include a pilot hydraulic source and solenoid proportional valves for generating the control pressures based on the pilot hydraulic source.

Preferably, the drive means of the distribution compensating valve includes means for driving the distribution compensating valve in the valve-opening direction with a constant force, and a drive part for generating a control force to drive the distribution compensating valves in the valve-closing direction, and the second means controls the said drive part such that the control force is increased when the select signal output from the first means is a select signal to reduce operation speeds of said pair of travel motors.

The drive means of the distribution compensating valve may include a single drive part for generating a control force to drive the distribution compensating valve in the valve-opening direction. In this case, the second means controls the said drive part such that the control force is decreased when the select signal output from the first means is a select signal to reduce operation speeds of the pair of travel motors.

BRIEF DESCRIPTION OF THE DRAWINGS

FIG. 8 is a flowchart showing the control processing sequence for a distribution compensating valve executed in the controller;

BEST MODE FOR CARRYING OUT THE INVENTION

Hereinafter, preferred embodiments of the present invention will be described with reference to the accompanying drawings.

FIRST EMBODIMENT

At the outset, a first embodiment of the present invention will be explained by referring to FIGS. 1-12. In this embodiment, the present invention is applied to a hydraulic drive system for a hydraulic excavator.

CONSTITUTION

Figure 1:
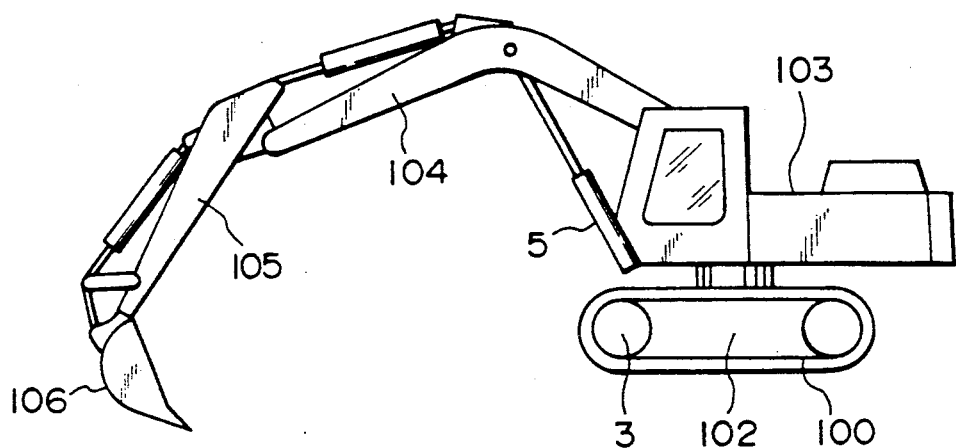
FIGS. 1 and 2 are a side view and a plan view of a hydraulic excavator equipped with a hydraulic drive system according to a first embodiment of the present invention, respectively.
Figure 2:
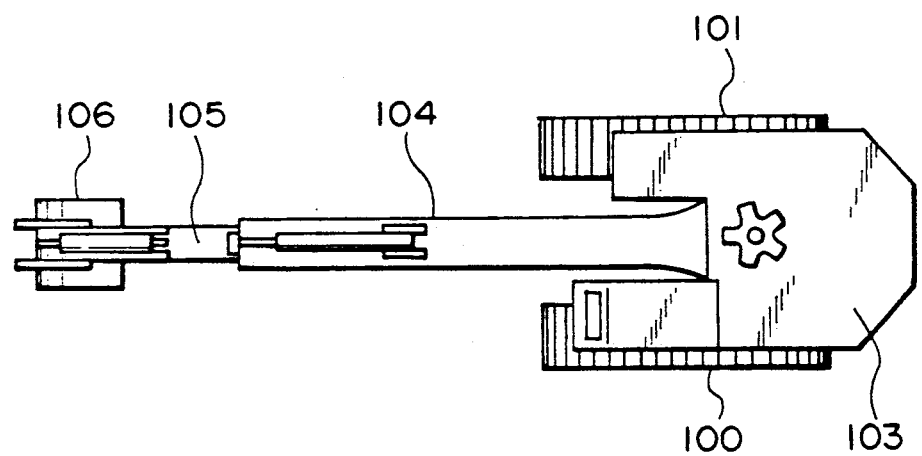

A hydraulic excavator comprises, as shown in FIGS. 1 and 2, a lower travel body 102 including a pair of left and right crawler belts 100, 101, an upper swing 103 which is swingably mounted on the lower travel body 102, and front attachments which are mounted to the upper swing 103 and constituted by a boom 104, an arm 105 and a bucket 106. The combined operation inclusive of traveling can be performed by operating a working member such as the boom 104, while driving the crawler belts 100, 101.

Figure 3:
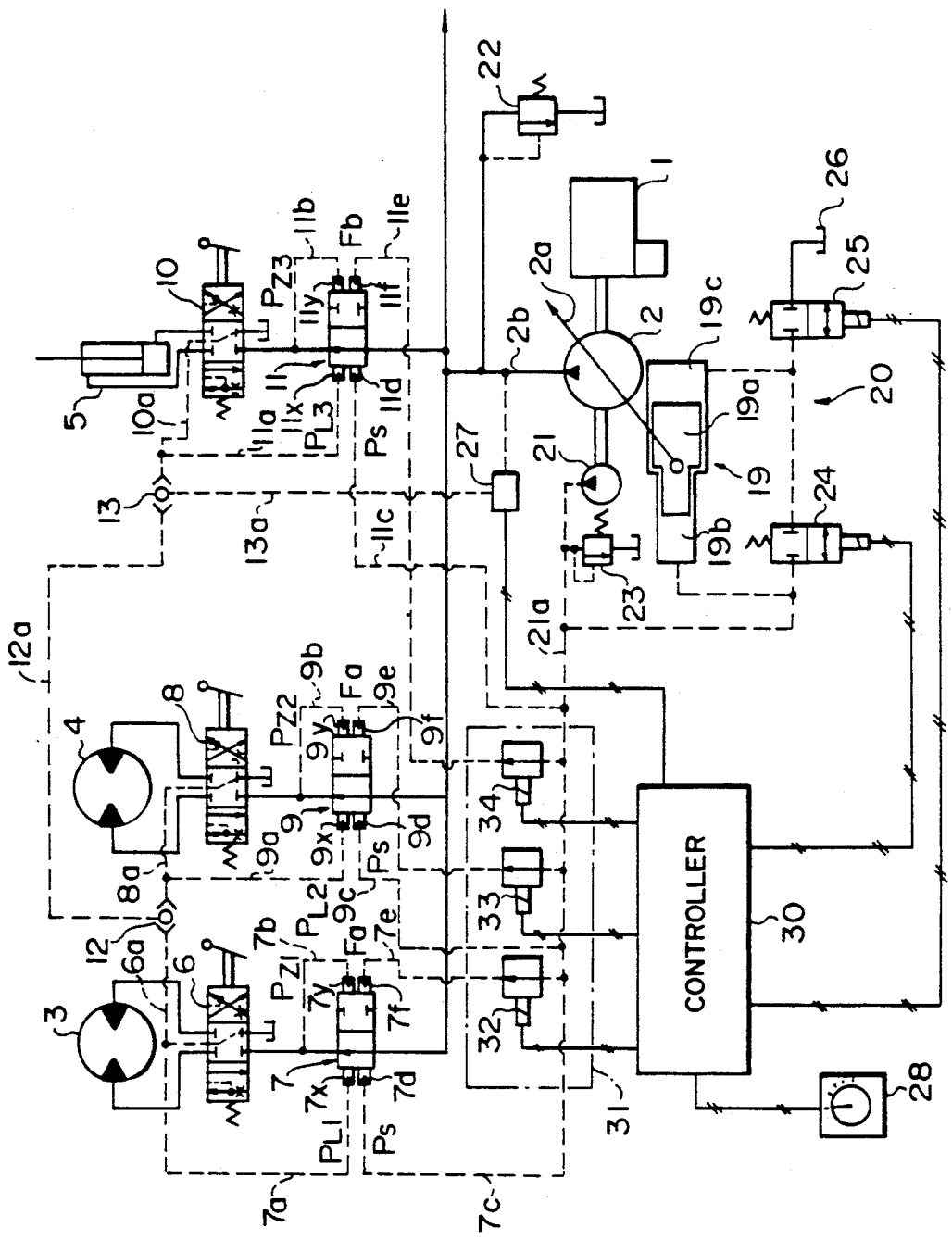
FIG. 3 is a diagrammatic view of the hydraulic drive system according to first embodiment.

The above hydraulic excavator is equipped with a hydraulic drive system of this embodiment. The hydraulic drive system comprises, as shown in FIG. 3, a primer mover 1, a hydraulic pump of variable displacement type driven by the primer mover 1, i.e., a main pump 2, a pair of left and right travel motors 3, 4 driven by a hydraulic fluid delivered from the main pump 2 for driving the left-hand and right-hand crawler belts 100, 101, respectively, and a boom cylinder 5 for driving the boom 104 as one of the front attachments. The hydraulic drive system further comprises a flow control valve for controlling a flow of the hydraulic fluid supplied from the main pump 2 to the left-hand travel motor 3, i.e., a left-hand traveling directional control valve 6, a pressure compensating valve for controlling a differential pressure across the left-hand traveling directional control valve 6, i.e., a distribution compensating valve 7, a flow control valve for controlling a flow of the hydraulic fluid supplied from the main pump 2 to the right-hand travel motor 4, i.e., a right-hand traveling directional control valve 8, a pressure compensating valve for controlling a differential pressure across the right-hand traveling directional control valve 8, i.e., a distribution compensating valve 9, a flow control valve for controlling a flow of the hydraulic fluid supplied from the main pump 2 to the boom cylinder 5, i.e., a boom directional control valve 10, and a pressure compensating valve for controlling a differential pressure across the boom directional control valve 10, i.e., a distribution compensating valve 11.

Connected to the flow control valves 6, 8, 10 are detection lines 6a, 8a, 10a for extracting load pressures of the left-hand travel motor 3, the right-hand travel motor 4 and the boom cylinder 4, respectively. The higher of the load pressures transmitted to the detection lines 6a, 8a is selected by a shuttle valve 12 and output to a detection line 12a. Then, the higher of the load pressures transmitted to the detection lines 10a, 12a, i.e., a maximum load pressure, is selected by a shuttle valve 13 and output to a detection line 13a.

The distribution compensating valves 7, 9, 11 respectively have drive parts $7x$, $9x$, $11x$ which are subjected via lines 7a, 9a, 11a to the load pressures PL1, PL2, PL3 extracted by the detection lines 6a, 8a, 10a (i.e., pressures at the outlet side of the corresponding flow control valves 6, 8, 10) for urging the distribution compensating valves in the valve-opening direction, drive parts $7y$, $9y$, $11y$ which are subjected via lines 7b, 9b, 11b to pressures Pz1, Pz2, Pz3 at the inlet side of the corresponding flow control valves 6, 8, 10 for urging the distribution compensating valves in the valve-closing direction, drive parts 7d, 9d, 11d which are subjected via lines 7c, 9c, 11c to the same, constant pilot pressure Ps, described later, for urging the distribution compensating valves in the valve-opening direction, and drive parts 7f, 9f, 11f which are subjected via lines 7e, 9e, 11e to control pressures Fa, Fa, Fb, described later, for urging the distribution compensating valves in the valve-closing direction. The drive parts $7x$, $9x$, $11x$ and $7y$, $9y$, $11y$ function to feed back the differential pressures Pz1-PL1, Pz2-PL2 and Pz3-PL3 across the flow control valves 6, 8, 10, while the drive parts 7d, 9d, 11d and 7f, 9f, 11f function to set respective target values of those differential pressures. By introducing the aforesaid pilot pressure and control pressures to the drive parts 7d, 9d, 11d and 7f, 9f, 11f, the target values of the differential pressures corresponding to differences between control forces produced in the drive parts 7d, 9d, 11d and control forces produced in the drive parts 7f, 9f, 11f are set and the differential pressures across the flow control valves 6, 8, 10 are controlled to be held at the respective target values.

The hydraulic drive system of this embodiment also comprises a pump regulator 20 for controlling the tilting amount (displacement volume) of a displacement volume varying mechanism of the main pump 2, i.e., a swash plate 2a, a pilot pump 21 rotatively driven in synchronism with the main pump 2, a main relief valve 22 for specifying a maximum pressure of the hydraulic fluid delivered from the main pump 2, and a relief valve 23 connected to a pilot line 21a, which is in turn connected to a delivery port of a pilot pump 2, for specifying a pilot pressure delivered from the pilot pump 21. The pilot line 21a is connected to the lines 7c, 9c, 11c respectively associated with the distribution compensating valves 7, 9, 11 so that the pilot pressure is introduced to their drive parts 7d, 9d, 11d.

The pump regulator 20 comprises an actuator 19 coupled with the swash plate 2a of the main pump 2 to drive the swash plate 2a, and two solenoid selector valves 24, 25 for controlling operation of the actuator 19. The actuator 19 is of a double-acting cylinder unit which has a piston 19a formed at its opposite end faces with the pressure receiving areas difficult from each other, and a small-diameter cylinder chamber 19b and a large-diameter cylinder chamber 19c positioned facing the opposite end faces of the piston 19a. The small-diameter cylinder chamber 19b is always communicated with the pilot line 21a and selectively communicable with a reservoir (tank) 26 via the two solenoid selector valves 24, 25. The large-diameter cylinder chamber 19c is communicated with the pilot line 21a via the solenoid selector valve 24 and with the reservoir 26 via the solenoid selector valve 25.

In the illustrated state where the solenoid selector valves 24, 25 are both in their closed positions, the piston 19a is held stopped and hence the tilting amount of the swash plate 2a remains unchanged. When the solenoid selector valve 24 is shifted to its open position, the piston 19a is moved leftwardly on the drawing due to the difference in pressure receiving area between both the opposite end faces of the piston 19a, thereby increasing the tilting amount of the swash plate 2a. As a result, the delivery rate of the main pump 2 is increased. When the solenoid selector valve 25 is shifted to its open position while keeping the solenoid selector valve 24 in the illustrated closed position, the large-diameter cylinder chamber 19c is communicated with the reservoir 26, whereupon the piston 19a is moved rightwardly on the drawing to reduce the tilting amount of the swash plate 2a. As a result, the delivery rate of the main pump 2 is decreased. In this way, the solenoid selector valves 24, 25 are subjected to on/off control for controlling the delivery rate of the main pump 2a.

The hydraulic drive system of this embodiment further comprises a differential pressure sensor 27 for detecting a load sensing differential pressure $\Delta PLS$ given by the differential pressure between the delivery pressure Ps of the main pump 2 and the maximum load pressure Pamax among the actuators, a selector 28 for outputting a select signal W to change an operation speed of the left-hand travel motor 3 and the right-hand travel motor 4, i.e., a traveling speed, a controller 30 for receiving a detection signal from the differential pressure sensor 27 and the select signal W from the selector 28 and performing prescribed arithmetic operation to output a control signal for the main pump 2 and control signals for the distribution compensating valves 7, 9, 11, and control pressure generating means 31 for generating the control pressures Fa, Fa, Fb in accordance with the control signals for the distribution compensating valves 7, 9, 11. Control signals for the main pump 2 from the controller 30 are output to the solenoid selector valves 24, 25. The controller 30 and the control pressure generating means 31 jointly constitute means for controlling the drive parts 7f, 9f of the distribution compensating valves 7, 9 associated with the pair of left and right travel motors 3, 4 dependent on the select signal W output from the selector 28, thereby to vary the target values of the differential pressures across the flow control valves 6, 8.

The selector 28 has a plurality of shift positions to set operation speeds of the left-hand travel motor 3 and the right-hand travel motor 4, e.g., four shift positions; as OFF position and three ON positions respresenting high, middle and low speeds. At any one of the three ON positions, the select signal W corresponding to the selected shift position is output from the selector 28.

The control pressure generating means 31 has solenoid proportional valves 32, 33, 34 disposed between lines 7e, 9e, 11e connected to the drive parts 7f, 9f, 11f of the distribution compensating valves 7, 9, 11 and the pilot line 21a, respectively. The solenoid proportional valves 32, 33, 34 are changed in their openings dependent on the control signals from the controller 30 to output the control pressures Fa, Fa, Fb dependent on the respective control signals.

Figure 4:
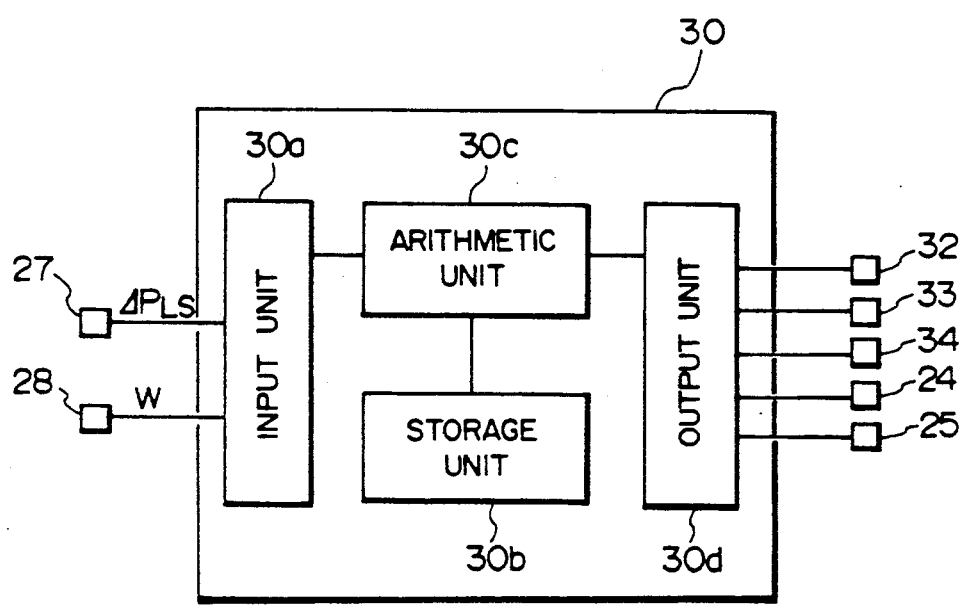
FIG. 4 is a block diagram of a controller constituting a part of the hydraulic drive system.
Figure 5:
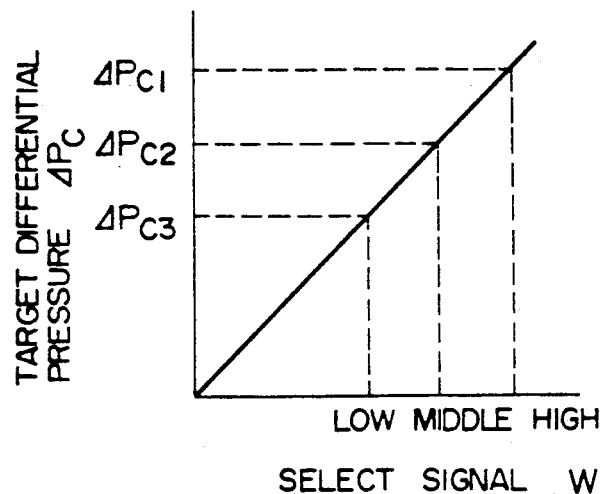
FIGS. 5, 6 and 7 are graphs showing the first, second and third functional relationship set in the controller, respectively.
Figure 6:
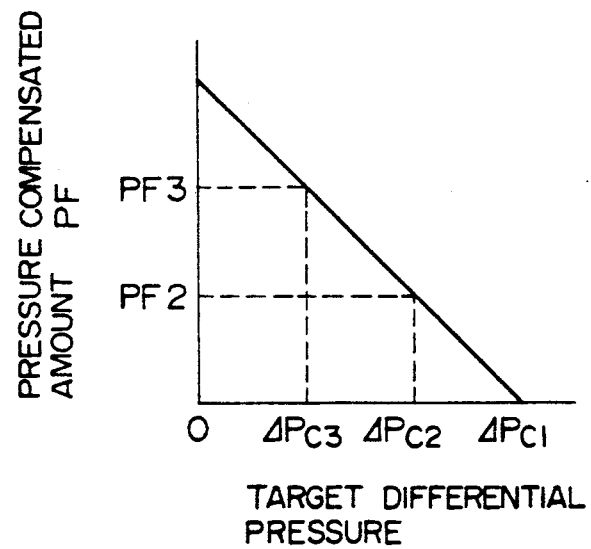
Figure 7:
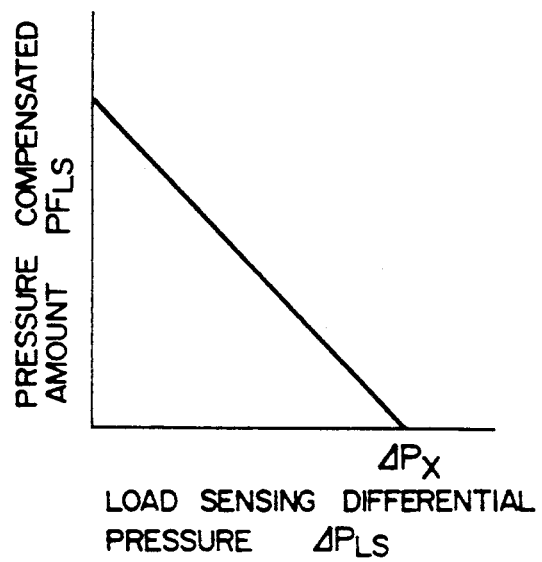

As shown in FIG. 4, the controller 30 has an input unit 30a, a storage unit 30b, an arithmetic unit 30c and an output unit 30d. The differential pressure sensor 27 and the selector 28 are connected to the input unit 30a of the controller 30, while the solenoid selector valves 24, 25 and the solenoid proportional valves 32, 33, 34 are connected to the output unit 30d thereof. The storage unit 30b stores therein the first functional relationship between the select signal W output from the selector 28 and the target value of the differential pressure across each of the flow control valves, i.e., a target differential pressure $\Delta Pc$ as shown in FIG. 5, the second functional relationship between the target differential pressure $\Delta Pc$ and a pressure compensated amount PF corresponding to the control force to be produced in each of the drive parts 7f, 9f of the distribution compensating valve 7, 9 as shown in FIG. 6, and the third functional relationship between the load sensing differential pressure $\Delta PLS$ detected by the differential pressure sensor 27 and a pressure compensated amount PFLS corresponding to the control force to be produced in the drive part 11f of the distribution compensating valve 11 as shown in FIG. 7. The storage unit 30b also stores therein a target load sensing differential pressure, i.e., a target value $\Delta Px$ of the differential pressure $\Delta PLS$ between the pump delivery pressure and the maximum load pressure, to be held by the circuit of the hydraulic drive system shown in FIG. 3.

The first functional relationship shown in FIG. 5 is set such that as the select signal W is shifted in its level from a low speed to a middle speed and then a high speed, the target differential pressure $\Delta Pc$ is gradually increased from $\Delta Pc3$ to $\Delta Pc2$ and then $\Delta Pc1$. Because of the drive parts 7f, 9f of the distribution compensating valves 7, 9 applying the control forces in the valve-closing direction, the second functional relationship shown in FIG. 6 is set such that as the target differential pressure $\Delta Pc$ is increased from $\Delta Pc3$ to $\Delta Pc2$ and then $\Delta Pc1$, the control force, i.e., the pressure compensated amount PF, is gradually decreased from PF3 to PF2 and then 0. Because of the drive part 11f of the distribution compensating valve 11 applying the control force in the valve-closing direction, the third functional relationship shown in FIG. 7 is set such that the control force, i.e., the pressure compensated amount PFLS, is 0 when the load sensing differential pressure $\Delta PLS$ is near the target value $\Delta Px$, and it is increased as the load sensing differential pressure $\Delta PLS$ is decreased from the target value $\Delta Px$.

OPERATION

Operation of this embodiment thus constituted will be described below. First, control of the distribution compensating valves 7, 9, 11 in this embodiment will be explained with reference to a flowchart shown in FIG. 8.

At the outset, as shown in step S1, the load sensing differential pressure $\Delta PLS$ detected by the differential pressure sensor 27 and the select signal W output from the selector 28 are read into the arithmetic unit 30c of the controller 30 via the input unit 30a. The control flow then proceeds to step S2 where the arithmetic unit 30c determines whether or not the select signal W is being input. Assuming now that the select signal W is not being input, this means the case where a change in the traveling speed is not especially intended, and hence the control flow proceeds to step S3. In step S3, the third functional relationship shown in FIG. 7 stored in the storage unit $30b$ is read out to the arithmetic unit $30c$, and the control force, i.e., the pressure compensated amount PFLS, corresponding to the load sensing differential pressure $\Delta$PLS is calculated.

The control flow then proceeds to step S4 where the control signals dependent on the same pressure compensated amount PFLS thus calculated are output to the respective drive parts of the solenoid proportional valves 32, 33, 34. The control pressures Fa, Fa, Fb (Fa=Fb=PFLS) of the same value are thereby applied to the drive parts $7f$, $9f$, $11f$ of the distribution compensating valves 7, 9, 11 from the pilot pump 21 via the solenoid proportional valves 32, 33, 34, respectively, so that the differential pressures across the flow control valves 6, 8, 10 are controlled to be held at the same target differential pressure corresponding to the pressure compensated amount PLS.

Figure 9:
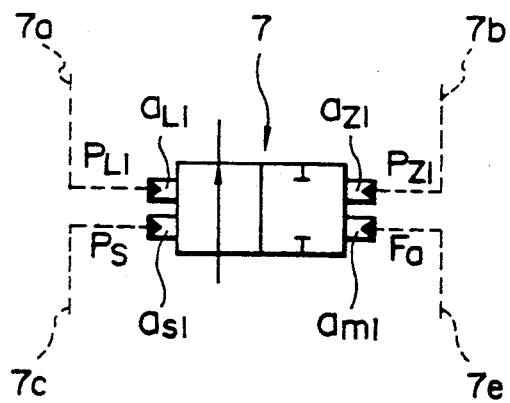
FIG. 9 is a view for explaining balance of forces acting on a distribution compensating valve associated with a travel motor.

More specifically, balance of the forces acting on the drive parts $7x$, $7y$ and $7d$, $7f$ of the distribution compensating valve at this time is expressed by the following equation, assuming that the drive parts $7x$, $7y$, $7d$ and $7f$ have their pressure receiving areas aL1, az1, as1 and am1, respectively as shown in FIG. 9:

$$PL1\cdot aL1 + Ps\cdot as1 = Pz1\cdot az1 + Fa\cdot am1 \quad (1)$$

Given aL1=as1=az1=am1 for convenience of explanation, the differential pressure Pz1-PL1 across the left-hand traveling directional control valve 6 is expressed by:

$$Pz1\text{-}PL1 = Ps\text{-}Fa \quad (2)$$

Likewise, the differential pressures Pz2-PL2, Pz3-PL3 across the right-hand traveling directional control valve 8 and the boom directional control valve 10 are expressed by:

$$Pz2\text{-}PL2 = Ps\text{-}Fa \quad (3)$$

$$Pz3\text{-}PL3 = Ps\text{-}Fb \quad (4)$$

As will be apparent from the equations (2)-(4), the differential pressures across the left-hand traveling directional control valve 6, the right-hand traveling directional control valve 8 and the boom directional control valve 10 are all equal to one another. Accordingly, the distribution ratio of flow rates of the hydraulic fluid delivered from the main pump 2 to the respective actuators is held constant. As a result that the hydraulic fluid is supplied to the actuators at the flow rates dependent on the openings of the associated directional control valves regardless of fluctuations in loads of the actuators, thereby making it possible to perform the combined operation of traveling and boom-up/down as with the conventional system.

Now, if the selector 28 is shifted to the low-speed position, for example, in an attempt to lower the traveling speed during the combined operation of traveling and boom-up/down, the aforesaid decision of step S2 in FIG. 8 is satisfied, followed by proceeding to step S5. In step S5, the first functional relationship shown in FIG. 5 and the second functional relationship shown in FIG. 6 are read out. More specifically, the smaller target differential pressure $\Delta$Pc3 corresponding to the aforesaid low-speed position is first determined from the first functional relationship shown in FIG. 5. The control flow then proceeds to step S6 where the larger pressure compensated amount PF3 corresponding to the target differential pressure $\Delta$Pc3 is determined as the control force for the distribution compensating valves 7, 9, i.e., the pressure compensated amount PF, from the second functional relationship shown in FIG. 6. Afterward, the control flow proceeds to step S7 where the third functional relationship shown in FIG. 7 is read out and the value dependent on the load sensing differential pressure $\Delta$PLS is determined as the pressure compensated amount PFLS for the distribution compensating valve 11.

Thereafter, the control flow proceeds to step S8 where the control signals each corresponding to the pressure compensated amount PF=PF3 are output to the drive parts of the solenoid proportional valves 32, 33, and the control signal corresponding to the pressure compensated amount PFLS is output to the solenoid proportional valve 34. This causes the same control pressure Fa (Fa=PF=PF3) to be applied to each of the drive parts $7f$, $9f$ of the distribution compensating valves 7, 9 from the pilot pump 21 via the solenoid proportional valves 32, 33, respectively, so that the differential pressures across the flow control valves 6, 8 are each controlled to be held at the target differential pressure $\Delta$Pc3. Also, the control pressure Fb (Fb=PFLS) is applied to the drive part $11f$ of the distribution compensating valve 11 from the pilot pump 21 via the solenoid proportional valve 34, so that the differential pressure across the flow control valve 10 is controlled to be held at the target differential pressure corresponding to the pressure compensated amount PFLS.

Stated differently, in this case, the control pressure Fa in each of the above equations (2) and (3) corresponds to the pressure compensated amount PF3 shown in FIG. 6 and is larger than the value of the control pressure Fb in the equation (4) corresponding to the pressure compensated amount PFLS if the load sensing differential pressure $\Delta$PLS is near the target value $\Delta$Px. Therefore, the urging force acting on each of the distribution compensating valves 7, 9 in the valve-closing direction becomes larger than the urging force acting on the distribution compensating valve 11 in the valve-closing direction. As a consequence, the differential pressures Pz1-PL1, Pz2-PL2 across the left-hand traveling directional control valve 6 and the right-hand traveling directional control valve 8 are controlled to be equal to each other and smaller than the differential pressure Pz3-PL3 across the boom directional control valve 10.

Assuming now that the flow rate of the hydraulic fluid passing through the directional control valve is Q, the opening area of the directional control valve is A, the differential pressure across the directional control valve is $\Delta$P, and the proportional constant is K, it is generally known that the following relationship holds:

$$Q = A \cdot K \sqrt{\Delta P} \quad (5)$$

It will be apparent from this relationship, the flow rate Q of the hydraulic fluid passing through each of the left-hand traveling directional control valve 6 and the right-hand traveling directional control valve 8, both subjected to the smaller differential pressure, becomes smaller than the flow rate Q passing through the boom directional control valve 10. As a result, operation speeds of both the left-hand travel motor 3 and the right-hand travel motor 4 can be lowered to reduce only the traveling speed, while keeping an operation speed of the boom cylinder 5 as it is.

Figure 10:
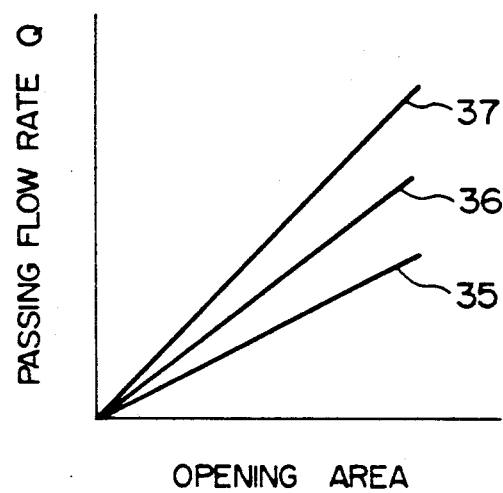
FIGS. 10 and 11 are graphs showing characteristics obtained under control of distribution compensating valves in the hydraulic drive system shown in FIG. 3, respectively.
Figure 11:
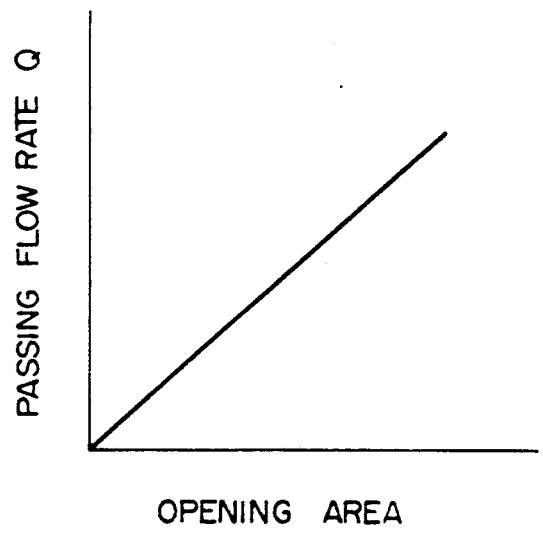

FIGS. 10 and 11 show flow rate characteristics resulted in this case. FIG. 10 is a characteristic graph showing the relationship between the opening area of the left-hand/right-hand traveling directional control valve 6, 8 and the flow rate Q of the hydraulic fluid passing therethrough. In the graph, a characteristic line 35 represents a characteristic to be followed when the selector 28 is shifted to the low-speed position as mentioned above. Characteristic lines 36, 37 represent characteristics to be followed when the selector 28 is shifted to the middle-speed and high-speed positions, respectively. FIG. 11 is a characteristic graph showing each of the relationship between the opening area of the boom directional control valve 10 and the flow rate Q of the hydraulic fluid passing therethrough, and the relationship between the opening area of the left-hand/right-hand traveling directional control valve 6, 8 and the flow rate Q of the hydraulic fluid passing therethrough as established when the selector 28 is at its OFF position.

Thus, the relationship between the opening area of each directional control valve and the flow rate Q of the hydraulic fluid passing therethrough, as established when the selector 28 is at its OFF position, is uniquely set as shown in FIG. 11. On the other hand, when the selector 28 is operated to one of the ON positions, the relationship between the opening area of the left-hand/right-hand traveling directional control valve 6, 8 and the flow rate Q of the hydraulic fluid passing therethrough is varied to follow corresponding one of the characteristic lines 35, 36, 37 shown in FIG. 10 upon the selector 28 being shifted to any of the low-speed, middle-speed and high-speed positions, while the relationship between the opening area of the boom directional control valve 10 and the flow rate Q of the hydraulic fluid passing therethrough remains to follow the characteristic shown in FIG. 11. By selectively operating the selector 28, therefore, it is possible to change only the traveling speed without changing the boom speed.

Figure 12:
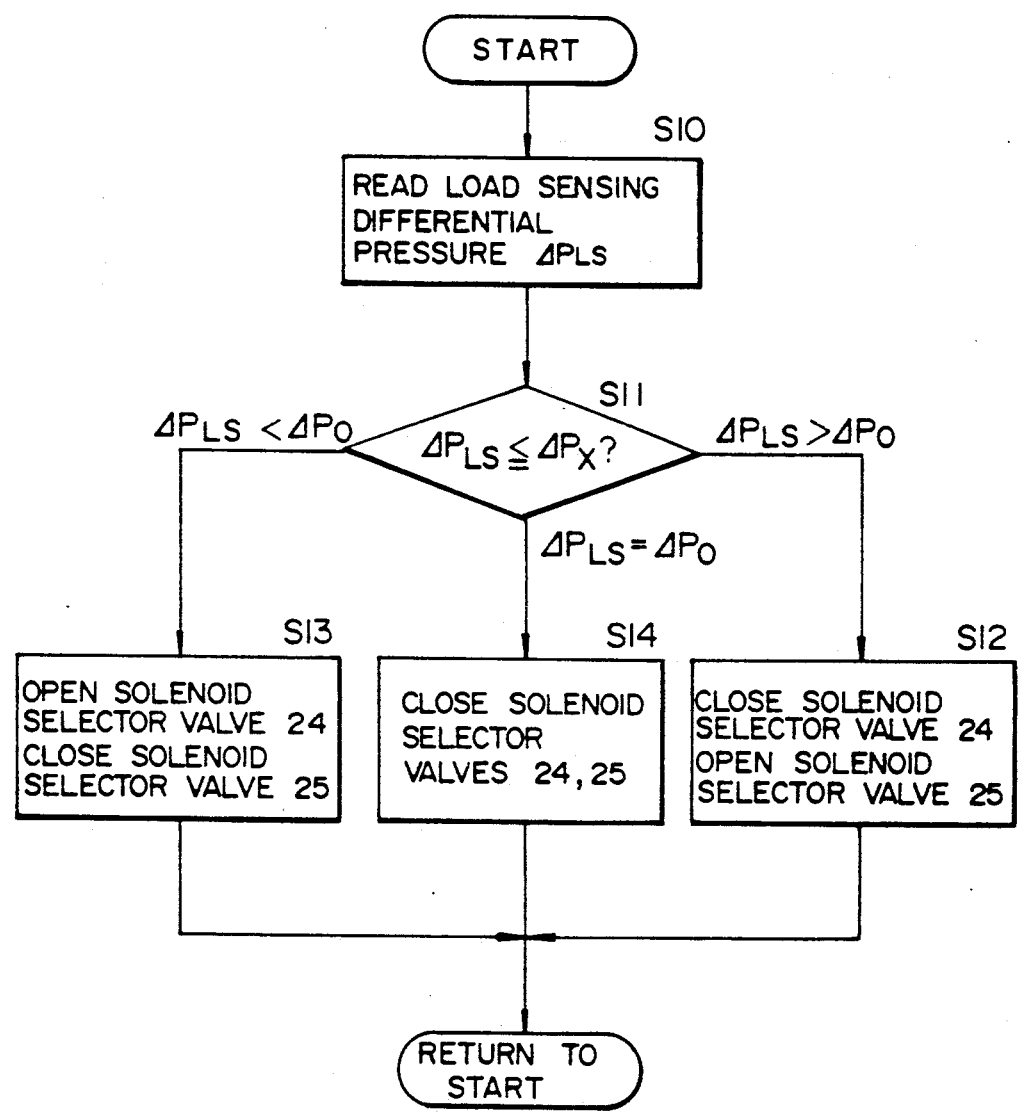
FIG. 12 is a flowchart showing the control processing sequence for the delivery rate of a main pump executed in the controller.

Next, control of the main pump 2 in this embodiment will be explained with reference to a flowchart shown in FIG. 12.

First, as shown in step S10, the load sensing differential pressure ΔPLS detected by the differential pressure sensor 27 is read into the arithmetic unit 30c of the controller 30 via the input unit 30a. The control flow then proceeds to step S11 where the aforesaid target value ΔPx of the load sensing differential pressure stored in the storage unit 30c is read out and compared with the load sensing differential pressure ΔPLS.

Now, if the load sensing differential pressure ΔPLS detected by the differential pressure sensor 27 is larger than the target value ΔPx, the control flow proceeds to step S12 where the control signal is output from the controller 30 to the drive part of the solenoid selector valve 25, so that the solenoid selector valve 25 is shifted to its open position for communicating the large-diameter cylinder chamber 19c of the actuator 19 with the reservoir 26. The piston 19a of the actuator 19 is thereby moved rightwardly in FIG. 3, because the pilot pressure of the pilot pump 21 is applied to the small-diameter cylinder chamber 19b of the actuator 19. As a result, the tilting amount of the swash plate 2a, i.e., the displacement volume, is changed to reduce the flow rate of the hydraulic fluid delivered from the main pump 2, and the differential pressure ΔPLS is controlled to approach the target value ΔPx.

On the contrary, if the load sensing differential pressure ΔPLS detected by the differential pressure sensor 27 is smaller than the target value ΔPx, the control flow proceeds to step S13 where the control signal is output from the controller 30 to the drive part of the solenoid selector valve 24, so that the solenoid selector valve 24 is shifted to its open position. This causes the pilot pressure of the pilot pump 21 to be applied to both the small-diameter cylinder chamber 19b and the large-diameter cylinder chamber 19c of the actuator 19, whereby the piston 19a is moved leftwardly in FIG. 3 due to the difference in pressure receiving area between the opposite end faces of the piston 19b. As a result, the tilting amount of the swash plate 2a is changed to increase the flow rate of the hydraulic fluid delivered from the main pump 2, and the differential pressure ΔPLS is controlled to approach the target value ΔPx.

If the load sensing differential pressure ΔPLS detected by the differential pressure sensor 27 is equal to the target value ΔPx, the control flow proceeds to step S14 where no control signal is output from the controller 30 to the drive parts of the solenoid selector valves 24, 25, so that the solenoid selector valves 24, 25 are both held at their closed positions. This stops movement of the piston 19a of the actuator 19, resulting in that the tilting amount of the swash plate 2a is maintained to keep constant the flow rate of the hydraulic fluid delivered from the main pump 2.

In the embodiment thus constituted, the traveling speed can be varied by selectively operating the selector 28 to control the drive parts 7f, 9f of the distribution compensating valves 7, 9 associated with the left-hand and right-hand travel motors 3, 4 and to change the target values of the differential pressures across the left-hand and right-hand traveling directional control valves 6, 8. This requires not to lower the revolution speed of the prime mover 1 and enables to change only the traveling speed independently. It is hence possible to hold the operation speed of the boom, etc. at a desired one regardless of changes in the traveling speed during the combined operation of traveling and boom-up/down, etc., and improve working efficiency and safety.

SECOND EMBODIMENT

A second embodiment of the present invention will be described with reference to FIGS. 13-16. This embodiment is different from the first embodiment in the manner of determining the pressure compensated amount for each of the distribution compensating valves associated with the left-hand and right-hand travel motors. The hardware has the essentially same constitution as that of the first embodiment shown in FIG. 3. Therefore, the reference numerals shown in FIG. 3 are also used in the following explanation.

In this embodiment, the selector 28 has three ON positions representing high, middle and low speeds as a plurality of shift positions to set operation speeds of the left-hand travel motor 3 and the right-hand travel motor 4, excepting the OFF position. The selector 28 is made up to output a select signal X corresponding to one of the shift positions.

Figure 13:
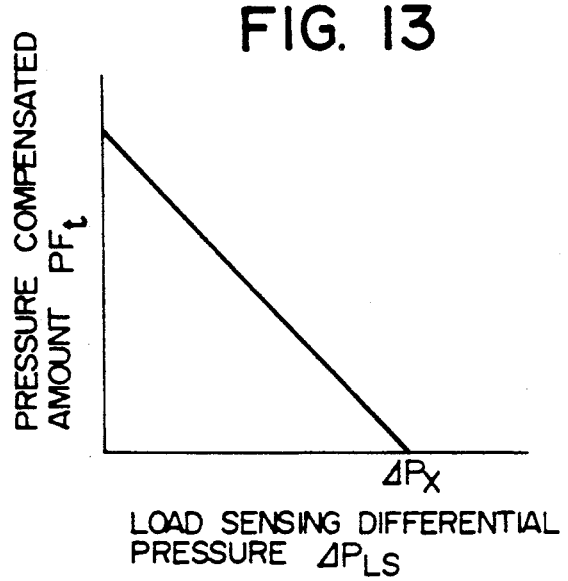
FIGS. 13, 14 and 15 are graphs showing the first, second and third functional relationship set in a controller of a hydraulic drive system according to a second embodiment of the present invention, respectively.
Figure 14:
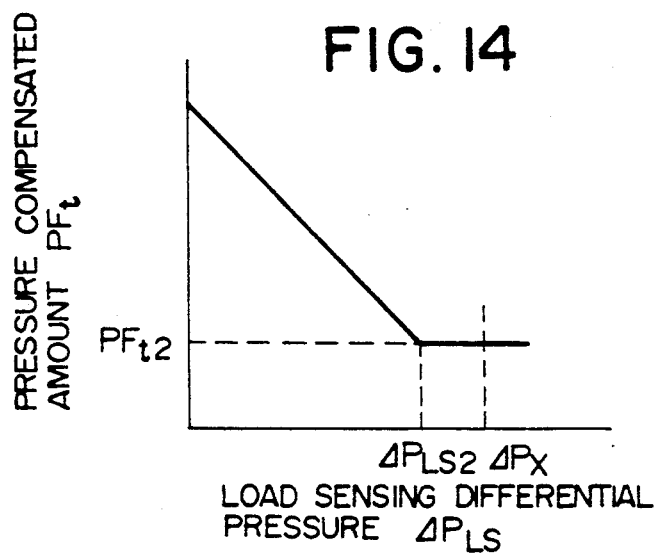
Figure 15:
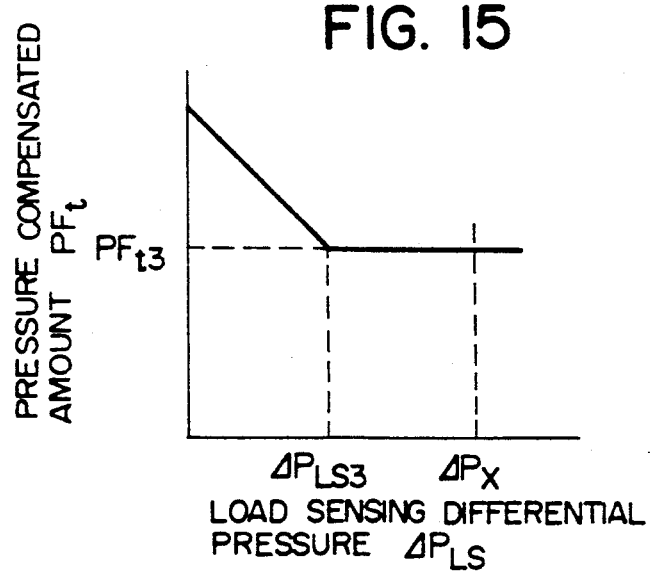

The storage unit 30b of the controller 30 stores therein the first functional relationship between the load sensing differential pressure ΔPLS detected by the differential pressure sensor 27 and a pressure compensated amount PFt corresponding to the control force to be produced in each of the distribution compensating valve 7, 9 for the select signal X output when the selector 28 is shifted to the high-speed position, as shown in FIG. 13, the second functional relationship between the load sensing differential pressure ΔPLS and a pressure compensated amount PFt corresponding to the control force to be produced in each of the distribution compensating valve 7, 9 for the select signal X output when the selector 28 is shifted to the middle-speed position, as shown in FIG. 14, and the third functional relationship between the load sensing differential pressure ΔPLS detected by the differential pressure sensor 27 and a pressure compensated amount PFt corresponding to the control force to be produced in each of the distribution compensating valve 7, 9 for the select signal X output when the selector 28 is shifted to the high-speed position, as shown in FIG. 15. The storage unit 30b also stores therein the fourth functional relationship between the load sensing differential pressure ΔPLS and a pressure compensated amount PFLS corresponding to the control force to be produced in the drive part 11f of the distribution compensating valve 11 as shown in FIG. 7, as well as the target value ΔPx of the differential pressure ΔPLS, similarly to the first embodiment.

The first functional relationship shown in FIG. 13 is similar to the fourth functional relationship shown in FIG. 7, and set such that the pressure compensated amount PFt is 0 when the load sensing differential pressure ΔPLS is near the target value ΔPx, and it is increased as the load sensing differential pressure ΔPLS is decreased from the target value ΔPx. The second functional relationship shown in FIG. 14 is set such that the pressure compensated amount PFt takes a certain value given by a pressure compensated amount PFt2 larger than 0 when the load sensing differential pressure ΔPLS is near the target value ΔPx, and it is increased as the load sensing differential pressure ΔPLS is decreased from a predetermined value ΔPLS2. The third functional relationship shown in FIG. 15 is set such that the pressure compensated amount PFt takes a certain value given by a pressure compensated amount PFt3 larger than the pressure compensated amount PFt2 when the load sensing differential pressure ΔPLS is near the target value ΔPx, and it is increased as the load sensing differential pressure ΔPLS is decreased from a predetermined value ΔPLS3.

Figure 16:
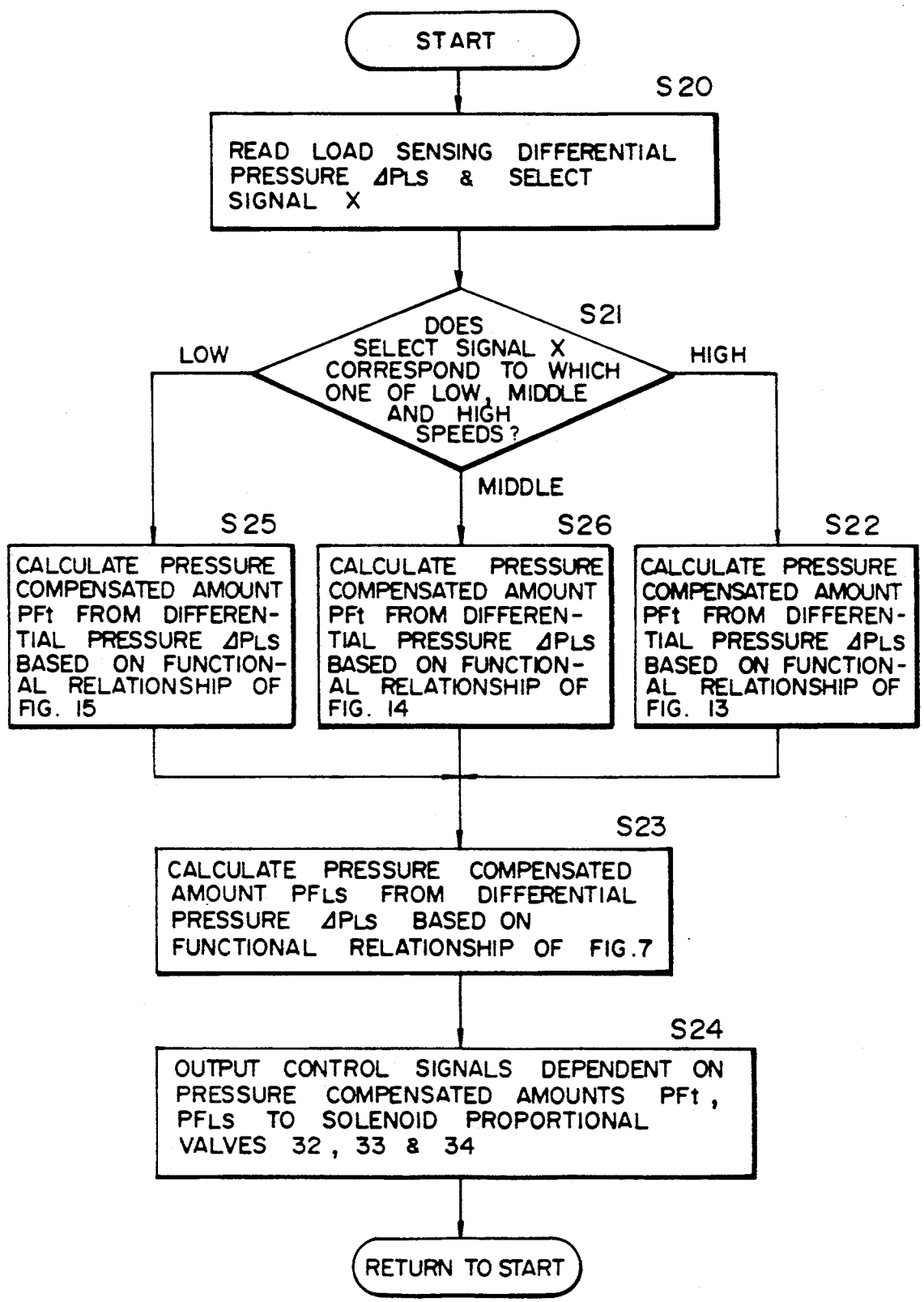
FIG. 16 is a flowchart showing the control processing sequence for a distribution compensating valve executed in the controller according to the second embodiment.

Control of the distribution compensating valves 7, 9, 11 in this embodiment thus constituted will be explained below with reference to a flowchart shown in FIG. 16.

First, as shown in step S20, the load sensing differential pressure ΔPLS detected by the differential pressure sensor 27 and the select signal X output from the selector 28 are read into the arithmetic unit 30c of the controller 30 via the input unit 30a. The control flow then proceeds to step S21 where it is determined that the select signal X corresponds to which one of shift positions of the selector 28 representing high, middle and low speeds. Assuming now that the selector 28 is shifted to the high-speed position in an attempt at high-speed traveling during the combined operation of traveling and boom-up/down, step S21 determines that the select signal X is one corresponding to the high-speed position, followed by proceeding to step S22. In step S22, the first functional relationship shown in FIG. 13 is read out and, if the load sensing differential pressure ΔPLS is near the target value ΔPx at this time, a relatively small value corresponding to that load sensing differential pressure ΔPLS is calculated as the pressure compensated amount PFt for the distribution compensating valves 7, 9.

The control flow then proceeds to step S23 where a similar relatively small value corresponding to that load sensing differential pressure ΔPLS is calculated from the fourth functional relationship shown in FIG. 7 as the pressure compensated amount PFLS for the distribution compensating valve 11.

Afterward, the control flow proceeds to step S24 where the control signal dependent on the pressure compensated amount PFt are output to each of the drive parts of the solenoid proportional valves 32, 33, and the control signal dependent on the pressure compensated amount PFLS is output to the drive part of the solenoid proportional valve 34. Accordingly, the control pressures Fa (Fa=PFt) of the same value are applied from the pilot pump 21 to the drive parts 7f, 9f of the distribution compensating valves 7, 9 via the solenoid proportional valves 32, 33, respectively, whereby the differential pressures across the flow control valves 6, 8 are each controlled to be held at a target differential pressure corresponding to the pressure compensated amount PFt. Also, the control pressure Fb (Fb=PFLS) is applied from the pilot pump 21 to the drive part 11f of the distribution valve 11 via the solenoid proportional valve 34, whereby the differential pressure across the flow control valve 10 is controlled to be held at a target differential pressure corresponding to the pressure compensated amount PFLS. Here, the functional relationship shown in FIG. 13 is similar to that shown in FIG. 7 as mentioned above. As a consequence, the differential pressures across the left-hand and right-hand and traveling directional control valves 6, 8 become almost equal to the differential pressure across the boom directional control valve 10, making it possible to perform the combined operation of traveling and boom-up/down in a like manner to the first embodiment.

Assuming now that the selector 28 is shifted to the low-speed position in an attempt of reducing only the traveling speed during the combined operation of traveling and boom-up/down, step S21 determines that the select signal X is one corresponding to the low-speed position, followed by proceeding to step S25. In step S25, the third functional relationship shown in FIG. 15 is read out and, if the load sensing differential pressure ΔPLS is near the target value ΔPx at this time, the relatively large pressure compensated amount PFt3 corresponding to that load sensing differential pressure ΔPLS is calculated as the pressure compensated amount PFt for the distribution compensating valves 7, 9. The control flow then proceeds to step S23 and step S24 to execute the processing similar to that as mentioned above. Accordingly, the relatively high control pressures Fa (Fa=PFt3) of the same value are applied to the drive parts 7f, 9f of the distribution compensating valves 7, 9, respectively, whereby the differential pressures across the flow control valves 6, 8 are each controlled to be held at a relatively small target differential pressure corresponding to the pressure compensated amount PFt3. Also, the control pressure Fb (Fb=PFLS) is applied to the drive part 11f of the distribution compensating valve 11, whereby the differential pressure across the flow control valve 10 is controlled to be held at the same target differential pressure as that given when the selector 28 is at the high-speed position.

Consequently, as with the first embodiment, the operation speeds of the left-hand travel motor 3 and the right-hand travel motor 4 can be lowered to reduce only the traveling speed, while holding the operation speed of the boom cylinder 5 as it is.

Further, assuming that the selector 28 is shifted to the middle-speed position in an attempt of reducing only the traveling speed a little from the high speed during the combined operation of traveling and boom-up/down, step S21 determines that the select signal X is one corresponding to the middle-speed position, followed by proceeding to step S26. In step S26, the second functional relationship shown in FIG. 14 is read out and, if the load sensing differential pressure ΔPLS is near the target value ΔPx at this time, the pressure compensated amount PFt2 corresponding to that load sensing differential pressure ΔPLS and smaller than the aforesaid pressure compensated amount PFt2 is calculated as the pressure compensated amount PFt for the distribution compensating valves 7, 9. In this case, therefore, only the differential pressures across the flow control valves 6, 8 are each controlled to be held at a target differential pressure smaller than that in the case of the high-speed position, but larger than that in the case of the low-speed position, permitting to lower only the traveling speed a little.

As described above, this embodiment can provide the essentially same advantageous effect as that in the first embodiment. Moreover, since the pressure compensated amount for each of the distribution compensating valves 7, 9 associated with the left-hand and right-hand travel motors 3, 4 is also calculated from the load sensing differential pressure ΔPLS in this embodiment, there can be provided another advantageous effect as follows. In the event that the pump delivery rate becomes insufficient and the main pump 2 gets into the so-called saturation during the combined operation inclusive of traveling, when the load sensing differential pressure ΔPLS falls below the predetermined value, e.g., ΔPLS3 in the case where the selector 28 is shifted to the low-speed position, the pressure compensated amount PFt is increased in a like manner to the case of the distribution compensating valve 11 associated with the boom cylinder 5 shown in FIG. 7. As a result, the distribution compensating control is carried out to achieve the combined operation of traveling and boom-up/down dependent on the ratio of the demanded flow rates.

OTHER EMBODIMENTS

Other several embodiments of the present invention will be described with reference to FIGS. 17-22.

First, modifications of the delivery rate control means for controlling the delivery rate of the main pump 2 will be explained by referring to FIGS. 17 and 18.

Figure 17:
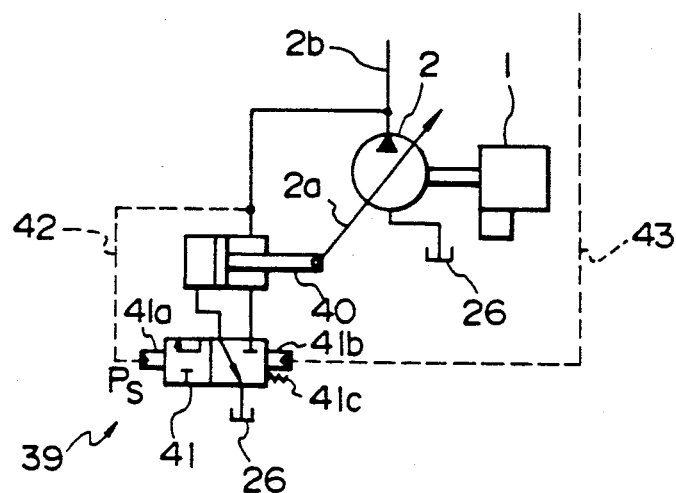
FIGS. 17 and 18 are each a diagrammatic view of a modified embodiment of delivery rate control means in the main pump.

FIG. 17 shows a modification in which the delivery rate control means is constituted by only a pump regulator 39 of hydraulic control type. The pump regulator 29 comprises an actuator 40 coupled with the swash plate 2a of the main pump 2 to drive the swash plate 2a, and a selector valve 41 for controlling selective communication of a bottom side chamber of the actuator 40 with the reservoir 26 or a rod side chamber of the actuator 40, thereby to regulate operation of the actuator 40. The selector valve 41 has two drive parts 41a, 41b opposite to each other. One drive part 41a is subjected to the delivery pressure Ps of the main pump 2 via a line 42, and the other drive part 41b is subjected via a line 43 to the maximum load pressure Pamax extracted by the aforesaid detection line 13a (see FIG. 3). A spring 41c for setting the load sensing differential pressure is provided on the side to which the maximum load pressure is introduced.

When the maximum load pressure introduced to the drive part 41b rises in the pump regulator 39 thus constituted, the selector valve 41 is moved leftwardly on the drawing, and the hydraulic fluid in the bottom side chamber of the actuator 40 is discharged into the reservoir 26. The piston is thereby moved leftwardly on the drawing to increase a tilting angle of the swash plate 2a. On the contrary, when the maximum load pressure falls, the selector valve 41 is moved rightwardly on the drawing to communicate the bottom side chamber with the rod side chamber of the actuator 40, whereupon the piston is moved rightwardly on the drawing due to a difference in pressure receiving area between the bottom side chamber and the rod side chamber, thereby reducing the tilting angle of the swash plate 2a. As a result, the pump delivery rate is controlled such that the differential pressure between the pump delivery pressure and the maximum load pressure is held at a value set by the spring 73.

Figure 18:
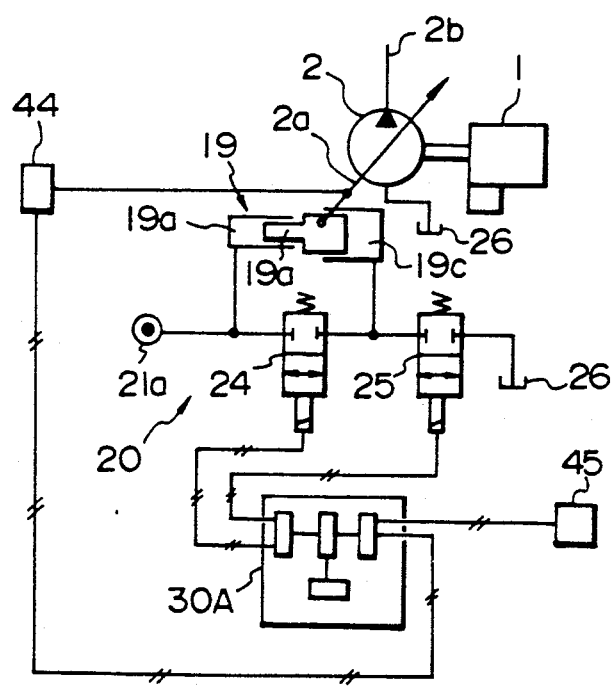

FIG. 18 shows another modification in which the pump delivery rate is controlled without resorting to the load sensing differential pressure. More specifically, the delivery rate control means shown in FIG. 18 comprises a pump regulator 20, as a unit for driving the swash plate 2a of the main pump 2, which has the same structure as that of the embodiment shown in FIG. 1, a tilting angle sensor 44 for detecting a tilting angle of the swash plate 2a of the main pump 2 and outputting a detection signal to an input unit of a controller 30A, and a command device 45 for commanding the target delivery rate, i.e, the target tilting angle, of the main pump 2 and outputting a command signal to the input unit of the controller 30A. The command device 45 may be designed, for example, to calculate the total demanded flow rate from the sum of operation amounts of control levers associated with the plural flow control valves, and then determine the target tilting angle by using the calculated total demanded flow rate as the target delivery rate.

With this delivery rate control means, the value of the command signal from the command device 45 and the value detected by the tilting angle sensor 44 are compared with each other in an arithmetic unit of the controller 30A. A drive signal dependent on the difference therebetween is output to the drive part of the solenoid selector valve 24 or 25 selectively from an output unit of the controller 30A, so that the hydraulic fluid is delivered from the main pump 2 at the flow rate corresponding to the value of the command signal, i.e., the target delivery rate.

Even in the case of constituting the delivery rate control means for the main pump 2 as mentioned above, by adopting the forgoing constitution of the first or second embodiment in control of the distribution compensating valves 7, 9, 11 (see FIG. 3), it is also possible to provide the advantageous effect similar to that in those embodiment.

Next, modification of the drive means for the distribution compensating valve will be described with reference to FIGS. 19-23. Any of modified distribution compensating valves will be explained as one to be substituted for the distribution compensating valve 7 associated with the left-hand travel motor 3 shown in FIG. 3.

Figure 19:
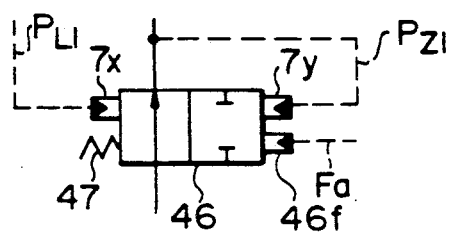
FIGS. 19 and 20 are each a view showing a modified embodiment of the distribution compensating valve.

A distribution compensating valve 46 shown in FIG. 19 is provided with a spring 47 in place of the drive part 7d of the distribution compensating valve 7 (see FIG. 3) to which the pilot pressure is introduced. It will be apparent that the distribution compensating valve 46 functions in a like manner to the distribution compensating valve 7.

Figure 20:
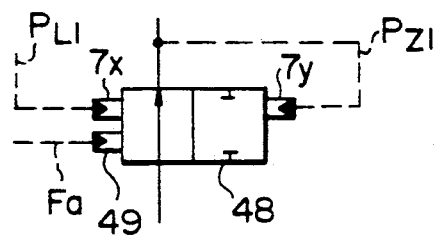
Figure 21:
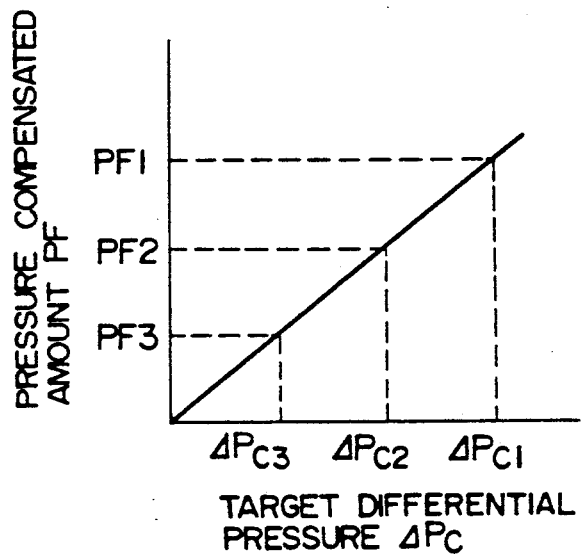
FIGS. 21 and 22 are graphs showing the functional relationship to be set in the controller, in place of the functional relationship shown in FIGS. 6 and 7, in the case of adopting the distribution compensating valve shown in FIG. 20.
Figure 22:
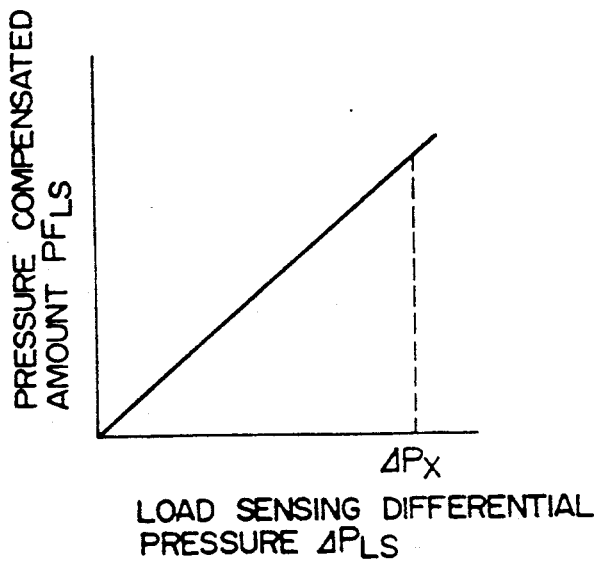

A distribution compensating valve 48 shown in FIG. 20 is provided with a single drive part 49 to apply a control force in the valve-opening direction, in place of the two drive parts 7d, 7f of the distribution compensating valve 7. The control pressure Fa from the solenoid proportional valve 32 (see FIG. 3) is introduced to the drive part 49. In this case, the first functional relationship between the select signal W and the target differential pressure ΔPc to be stored in the storage unit of the controller is the same as that shown in FIG. 5. However, since the drive part 49 applies the control force in the valve-opening direction, the second functional relationship between the target differential pressure ΔPc and the pressure compensated amount PF should be different from the characteristic shown in FIG. 6, and is set such that as the target differential pressure ΔPc is increased from ΔPc3 to ΔPc2 and then ΔPc1, the pressure compensated amount PF is also increased from PF3 to PF2 and then PF1 as shown in FIG. 21. Further, when this type distribution compensating valve is used in place of the distribution compensating valve 11 associated with the boom cylinder 5, the third functional relationship between the load sensing differential pressure ΔPLS and the pressure compensated amount PFLS should also be different from the characteristic shown in FIG. 7, and is set such that as the load sensing differential pressure ΔPLS is decreased from the target value ΔPx, the pressure compensated amount PFLS is also decreased as shown in FIG. 22.

While the distribution compensating valve 7 is adapted to obtain the control force in the valve-opening direction to produce the target differential pressure by the two drive parts 7d, 7f, the distribution compensating valve 48 is of the type to obtain the same control force in the valve-opening direction by the single drive part 49, whereby the distribution compensating valve 48 can operate in the essentially same manner as the distribution compensating valve 7 or 11 shown in FIG. 3, by applying the control pressure resulted from the foregoing functional relationship to the drive part 49. In addition, the distribution compensating valve 48 is simpler in the structure because of having the single drive part, with the result that manufacture errors can be suppressed small and control accuracy can be improved.

Figure 23:
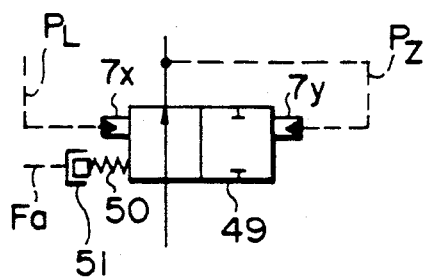
FIG. 23 is a view showing still another modified embodiment of the distribution compensating valve.

A distribution compensating valve 49 shown in FIG. 23 is provided with both a spring 50 and preset force varying means 51 adapted to vary a preset force of the spring 50 dependent on the control pressure Fa on the side to which the control force in the valve-opening direction is applied, in place of the drive parts 7d, 7f of the distribution compensating valve 7 arranged opposite to each other. In this case too, by setting two kinds of functional relationship of FIGS. 21 and 22 in the storage unit of the controller, the distribution compensating valve 49 operates in a like manner to the distribution compensating valve 7 or 11. Moreover, the distribution compensating valve 49 has an advantage that since the pressure receiving area of the preset force varying means 51 can be set irrespective of the size of pressure receiving area of the drive part 50, the degree of freedom is increased in design and manufacture.

INDUSTRIAL APPLICABILITY

According to the hydraulic drive system for a crawler mounted vehicle of the present invention, as described above, the traveling speed can be changed without depending on the delivery rate of the main pump. It is hence possible to change the traveling speed, without affecting the speed of another operation, during the combined operation of traveling and at least one other operation, and to improve working efficiency and safety in the other operation as compared with the prior art.

What is claimed is:

1. A hydraulic drive system for a crawler mounted vehicle having a hydraulic pump, a plurality of actuators including a pair of left and right travel motors and at least one other actuator that are driven by a hydraulic fluid delivered from said hydraulic pump, each of said actuators having a respective flow control valve associated with a respective distribution compensation valve, said flow control valves for controlling flows of hydraulic fluid supplied to said respective actuators, and said distribution compensating valves for controlling differential pressures across said respective flow control valves, said plurality of distribution compensating valves each having drive means for setting a target value of the differential pressure across the associated flow control valve, said hydraulic drive system further comprising:

first means for outputting a select signal to change operational speeds of said pair of travel motors; and second means for varying the target value of the differential pressure set by said drive means of the distriution compensating valves associated with said pair of travel motors only dependent on the select signal output from said first means independently of the target value of the differential pressure set by the drive means of the distribution compensating valve associated with said other actuator.

2. A hydraulic drive system for a crawler mounted vehicle according to claim 1, wherein said first means is a selector having a plurality of shift positions related to the operation speeds of said pair of travel motors for outputting the select signal corresponding to a selected one of said shift positions.

3. A hydraulic drive system for a crawler mounted vehicle according to claim 1, wherein said second means includes third means for determining a control force dependent on the select signal output form said first means, and fourth means for controlling the drive means of said distribution compensating valves such that the control force is applied to said distribution compensating valves associated with said pair of travel motors.

4. A hydraulic drive system for a crawler mounted vehicle according to claim 3, wherein said third means includes means for storing the functional relationship between the select signal output from said first means and the control force to be applied to said distribution compensating valves associated with said pair of travel motors, and means for determining the control force dependent on the select signal output from said first means based on the select signal and said functional relationship.

5. A hydraulic drive system for a crawler mounted vehicle according to claim 3, wherein said third means includes means for detecting a differential pressure between the delivery pressure of said hydraulic pump and the maximum load pressure among said plurality of actuators, means for storing a plurality of functional relationships between said detected differential pressure and the control force to be applied to said distribution compensating valves associated with said pair of travel motors, and means for selecting one of said plurality of functional relationships dependent on the select signal output from said first means and determining the control force corresponding to said detected differential pressure based on that differential pressure and the selected functional relationship.

6. A hydraulic drive system for a crawler mounted vehicle according to claim 1, wherein said second means includes a controller for calculating control forces to be applied to said distribution compensating valves and outputting corresponding signals, and control pressure generating means for generating control pressures dependent on the calculated control forces in accordance with the output signals.

7. A hydraulic drive system for a crawler mounted vehicle according to claim 6, wherein said control force generating means includes a pilot hydraulic source and solenoid proportional valves for generating said control pressures based on said pilot hydraulic source.

8. A hydraulic drive system for a crawler mounted vehicle according to claim 1, wherein the drive means of said distribution compensating valves include means for driving said distribution compensating valves in the valve-opening direction with constant forces, and drive parts for generating control forces to drive said distribution compensating valves in the valve-closing direction, and wherein said second means controls said drive parts such that said control forces are increased when the select signal output from said first means is a select signal to reduce operation speeds of said pair of travel motors.

9. A hydraulic drive system for a crawler mounted vehicle according to claim 1, wherein the drive means of said distribution compensating valve includes a single drive part for generating a control force to drive said distribution compensating valve in the valve-opening direction, and wherein said second means controls said drive part such that said control force is decreased when the select signal output from said first means is a select signal to reduce operation speed of said pair of travel motors.

10. A hydraulic drive system for a crawler mounted vehicle having a hydraulic pump, a plurality of actuators including a pair of left and right travel motors and at least one other actuator that are driven by hydraulic fluid delivered from said hydraulic pump, each of said actuators having a respective flow control valve associated with a respective distribution compensation valve, each actuator having a load pressure, flow control valve means for controlling the flow of the hydraulic fluid supplied to said respective actuators, and a plurality of distribution compensating valves for controlling differential pressures across said respective flow control valves, said plurality of distribution compensating valves each having drive means to set a target value of the differential pressure across the associated flow control valve, said hydraulic drive system further comprising:

first means for controlling said drive means of the distribution compensating valves associated with said pair of travel motors and said drive means of the distribution compensating valve associated with said other actuator based on a differential pressure between the delivery pressure of said hydraulic pump and the maximum load pressure among said plurality of actuators to cause each drive means to set a value dependent on said differential pressure between the pump delivery pressure and the maximum load pressure as said target value of the differential pressure across the associated flow control valve;

second means for outputting a select signal to change operation speeds of said pair of travel motors; and third means for controlling said drive means of the distribution compensating valves associated with said pair of travel motors only dependent on the select signal output from said first means to vary the target values of the differential pressures across the associated flow control valves independently of the target value of the differential pressure set by the drive means of the distribution compensating valve associated with said other actuator.

* * * * *